United States Patent

[11] 3,624,083

[72] Inventors Thomas A. Dobson
St. Laurent, Quebec;
Martin A. Davis, Montreal, Quebec, both of Canada
[21] Appl. No. 885,642
[22] Filed Dec. 16, 1969
[45] Patented Nov. 30, 1971
[73] Assignee American Home Products Corporation
New York, N.Y.
Original application Jan. 1, 1967, Ser. No. 609,788, now Patent No. 3,535,340.
Divided and this application Dec. 16, 1969, Ser. No. 885,642

[54] BASICALLY SUBSTITUTED 10,5-(EPOXYMETHANO)-10,11-DIHYDRO-5H-DIBENZO[A,D]CYCLOHEPTENES 11
9 Claims, No Drawings
[52] U.S. Cl. .................................................. 260/247.7,
260/268, 260/294.7, 260/326.81, 260/333, 260/343.2, 260/571, 424/248, 424/263, 424/267, 424/274, 424/279
[51] Int. Cl. ..................................................... C07d 87/28
[50] Field of Search .......................................... 260/247.7
F, 294.7 C

[56] References Cited
OTHER REFERENCES
Dobson, et al., " Tetrahedron Letters" No. 42 (1967), pp. 4139–4142

*Primary Examiner*—Alex Mazel
*Assistant Examiner*—James H. Turnipseed
*Attorneys*—Vito Vector Bellino, Andrew Kafko, Joseph Martin Weigman, Dwight J. Potter, Robert Wiser and John Rauth ABSTRACT: There are disclosed herein a number of 11-substituted 10,5(epoxymethano)-10,11-dihydro-5H-dibenzo[a,d]cycloheptenes in which the substituent is position 11 is a dialkylamino group in which the alkyl groups are the same or different and contain from one–six carbon atoms each, the N-methylbenzylamino, the N-propylphenethylamine, the pyrrolidino, morpholino, derivatives N'-methylpiperazino, or N'-phenylpiperazino group. The intermediate 5-methanol derivatives with the seven substituents in position 11 as listed above are also described. The compounds are useful as trichomonicidal and anticonvulsant agents, and methods for their use as well as a process of preparation are also disclosed.

BASICALLY SUBSTITUTED 10,5-(EPOXYMETHANO)-10,11-DIHYDRO-5H-DIBENZO[A,D] CYCLOHEPTENES

This application is a divisional of our earlier-filed Pat. application Ser. No. 609,788, filed Jan. 1, 1967, now U.S. Pat. No. U.S. 3,535,340.

This invention relates to novel chemical compounds having useful biological properties. In particular, this invention relates to novel 10,5-(epoxymethano)-10,11-dihydro-5H - dibenzo[a,d]cycloheptanes of the following formula I

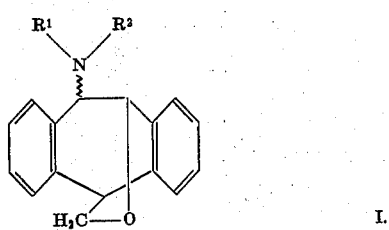

wherein $R^1$ and $R^2$ are the same or different and represent a lower alkyl group containing from one to six carbon atoms, or an aralkyl group containing from seven to ten carbon atoms such as, for example, the benzyl, phenethyl, or trimethoxybenzyl groups. In addition the grouping $NR^1R^2$ may itself form part of a heterocycle containing from one to two hetero atoms and from four to 10 carbon atoms, such as, for example, the pyrrolidino, piperidino, morpholino or 4-substituted piperazino groups such as, for example, the $N^1$-phenyl-piperazino or $N^1$-methyl-piperazino groups. This invention also comprises the acid addition salts of the compounds of formula I with pharmacologically acceptable acids such as, for example, sulfuric, hydrochloric, oxalic, maleic, or citric acids.

The compounds of formula I are readily prepared from the corresponding 11-substituted-10,5-(epoxymethano)-10,11-dihydro-5H-dibenzo[a,d]-cyclohepten13-ones of formula II wherein either $R^1$ and $R^2$ are as defined above or the grouping $NR^1R^2$ forms part of a heterocycle as defined above. Such a compound of formula II is treated with a complex alkali metal aluminum hydride to convert it to the corresponding 11-substituted-10-hydroxy-10,11-dihydro-5H-dibenzo[a,d]cycloheptene-5-methanol of formula III wherein either $R^1$ and $R^2$ or the grouping $NR^1R^2$ are as defined above. In its turn this compound is dehydrated with a mineral acid to give the corresponding compound of formula I.

More specifically, a mixture of 11-substituted 10,5-(epoxymethano)-10,11-dihydro-5H-dibenzo[a,d]cyclohepten-13-one of formula II wherein either $R^1$ and $R^2$ or the grouping $NR^1R^2$ is as defined above, an inert solvent such as, for example, ether, tetrahydrofuran or dioxan and a complex alkali metal aluminum hydride conveniently lithium aluminum hydride is stirred and heated at a temperature within the range of 30°–100° C. for a period of time of from 1 to 12 hours to give, after hydrolysis of the resulting complex with water, the corresponding 11-substituted-10-hydroxy-10,11-dihydro-5H-dibenzo[a,d]cyclohepten-5-methanol of formula III. In its turn this compound is treated with a molar excess of a 10–50 percent aqueous solution of a mineral acid, preferably sulfuric acid, at a temperature within the range of 50°–100° C. for a period of time of from 1 to 6 hours. The mixture is then rendered alkaline to liberate the corresponding compound of formula I wherein either $R^1$ and $R^2$ or the grouping $NR^1R^2$ are as defined above.

The compounds of this invention are active against Trichomonas vaginalis and are useful as trichomonicidal agents. As such they may be formulated with suitable excipients, such as, for example, starch or lactose, in the form of vaginal tablets or inserts containing from 50–250 mg. of the active ingredient and may be administered from one to three times per day. The compounds of this invention also possess anticorvulsant activity and are useful in treatment of certain disorders associated with convulsion. As such, they may be formulated with suitable excipients in the form of tablets or capsules containing from 75–300 mg. of the active ingredient and may be administered from one to several times per day.

The starting materials for the compounds of this invention, that is the 11-substituted-10,5-(epoxymethano)-10,11-dihydro-5H-dibenzo[a,d]cyclohepten-13-ones of formula II wherein either $R^1$ and $R^2$ or the grouping $NR^1R^2$ are as defined above are prepared as described in our copending U.S. Pat. application Ser. No. 591,106, filed Nov. 1, 1966. In brief, 1-molar proportion of bromine is added to 5H-dibenzo[a,d] cycloheptene-5-carboxamide, prepared as described by M. A. Davis et al. in J. Med. Chem. 7, 88 (1964) and the resulting dibromo compound is treated with boiling water or a boiling alkanol to give 11-bromo-10,5-(epoxymethano)-10,11-dihydro-5H-dibenzo[a,d]cyclohepten-13-one. This compound is then treated with a secondary amine of formula $HNR^1R^2$ wherein either $R^1$ or $R^2$ or the grouping $NR^1R^2$ are as defined above to give the corresponding compound of formula II.

Geometrical isomers of the above-described compounds of formula II are prepared by treating 11-bromo-10,5-(epoxymethano)-10,11-dihydro-5H-dibenzo[a,d]cyclohepten-13-one with an aqueous alkali metal hydroxide solution to give, after processing, 10,11-epoxy-10,11-dihydro-5H-dibenzo[a,d]cycloheptene-5-carboxylic acid. In its turn, this compound is treated with a molar excess of a secondary amine of formula $HNR^1R^2$ wherein either $R^1$ and $R^2$ or the grouping $NR^1R^2$ are as defined above, at a temperature within the range of 100°–150° C. in an inert solvent, such as, for example, toluene, or xylene for a period of time of up to one day to give the desired geometrical isomers of the compounds of formula II.

The following formulas and examples will illustrate this invention.

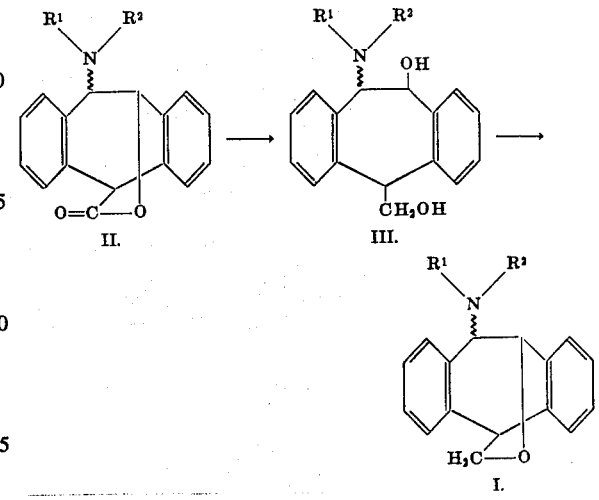

EXAMPLE 1

11-DIMETHYLAMINO-10,5-(EPOXYMETHANO)-10,11-DIHYDRO-5H-DIBENZO[a,d]CYCLOHEPTENE

A mixture of 11-dimethylamino-10,5-(epoxymethano)-10,11-dihydro-5H-dibenzo[a,d]cyclohepten-13-one (10.0 g., anhydrous ether (500 ml.), and lithium aluminum hydride (2.5 g.), is refluxed and stirred for 8 hours. The mixture is cooled and cautiously treated with water, filtered, and the solid residue is extracted with boiling methanol. The cooled extracts deposit crystals of 11-dimethylamine-10-hydroxy-10,11-dihydro-5H-dibenzo[a,d]cycloheptene-5-methanol with m.p. 208°–211° C.

A mixture of the above intermediate product (5.0 g.), water (20 ml.), and sulfuric acid (10 ml.), is heated on the steam bath for 6 hours. The cooled mixture is rendered alkaline and then extracted with ether. Evaporation of the ethereal extracts gives the title product as an oil characterized by its nuclear magnetic resonance spectrum with maxima at 430, 321, 230–320 and 154 c.p.s.

The hydrochloride salt is obtained by treating the above compound with either ethereal or methanolic hydrogen chloride. It is crystallized from ethanol-ether to m.p. 220°–225° C.

EXAMPLE 2

11-Morpholino-10,5-(Epoxymethano)-10,11-Dihydro5H-Dibenzo[a,d]Cycloheptene

A mixture of 11-morpholino-10,5-epoxymethano)-10,11-dihydro-5H-dibenzo[a,d]cyclohepten-13-one (12.0 g.), dry ether (500 ml.), and lithium aluminum hydride (4.0 g.) is refluxed and stirred for 6 hours. The mixture is cooled and then cautiously treated with water, filtered and the residue is extracted with boiling methanol. The cooled extracts deposit crystals of 11-morpholino-10-hydroxy-10,11-dihydro-5H-dibenzo[a,d]cycloheptene-5-methanol with m.p. 187°–188° C.

A mixture of this intermediate product (6.0 g.), water (20 ml.) and sulfuric acid (10 ml.) is heated on the steam bath for 5 hours. The cooled mixture is rendered alkaline and ether-extracted.

Evaporation of the extracts leaves the title product as an oil characterized by its nuclear magnetic resonance absorption spectrum with maxima at 432, 321, 220–270, and 170–180 c.p.s.

The hydrochloride salt is obtained as described above and is purified from ethanol-ether to m.p. 260°–270° C.

EXAMPLE 3

11-Piperidino-10,5-(Epoxymethano)- 10,11-Dihydro-5H-Dibenzo[a,d]Cycloheptene

In the same manner as described in example 2, but using 11-piperidino-10,5-(epoxymethano)-10,11-dihydro-5H-dibenzo[a,d]cyclohepten-13-one, with m.p. 200°–205° C., as starting material in place of 11-morpholino-10,5(epoxymethano)-10,11-dihydro-5H-dibenzo[a,d]-cyclohepten-13-one, is obtained 11-piperidino-10-hydroxy-10,11-dihydro-5H-dibenzo[a,d]cyclohepten-5-methanol with m.p. 200°–202° C. when crystallized from methanol.

This intermediate is treated with aqueous sulfuric acid in the same manner as described in example 2 to give the title product as an oil characterized by its nuclear magnetic resonance spectrum with maxima at 430, 320, 268, 260, 230–245, 170, and 92 c.p.s.

The hydrochloric acid addition salt is prepared as described above. It is crystallized from ethanol-ether to m.p. 273°–277° C.

Using as starting material a geometrical isomer of the above 11-piperidono-10,510,11-dihydro-5H-dibenzo[a,d]-cyclohepten-13-one, with m.p. 172°–174° C.; there is obtained a geometrical isomer of the title product. It is purified from ethyl acetate to m.p. 122°–125° C. and is further characterized by its nuclear magnetic resonance spectrum with maxima at 435, 312, 262, 230–250, 138 and 80 c.p.m.

EXAMPLE 4

11-(N'-Methylpiperazino)-10,5-(Epoxymethano)10,11-Dihydro-5H-Dibenzo[a,d]Cycloheptene In the same manner as described above, but using 11-(N'-methylpiperazino)-10,5-(epoxymethano)-10,11-dihydro-5H-dibenzo[a,d]cyclohepten-13-one as starting material there is obtained 11-(N'-methylpiperazino)-10,5-(epoxymethano)-10,11-dihydro-5H-dibenzo[a,d]cycloheptene-5-methanol which is purified from benzene to m.p. 187°–189° C.

This compound is cyclized with sulfuric acid in the same manner as described above to give the title product as an oil characterized by its nuclear magnetic resonance absorption spectrum with maxima at 430, 319, 267, 259, 231–244, 170–179, 145–150, and 147 c.p.s.

The dihydrochloric acid addition salt is prepared as described above and is purified from ethanol to m.p. 240°–250° C.

In the same manner, but using 11-(N'-phenylpiperazino)-10,5(epoxymethano)-10,11-dihydro-5H-dibenzo[a,d]cycloheptene-13-one as starting material, the corresponding 11-(N'-phenylpiperazino)-10,5(epoxymethano)-10,11-dihydro-5H-dibenzo[a,d]cycloheptene is obtained.

In the same manner, but using the corresponding 11-pyrrolidino derivative as starting material, 11-pyrrolidino-10,5-(epoxymethano)-10,11-dihydro-5H-dibenzo[a,dcycloheptene is obtained.

EXAMPLE 5

In a similar manner to that described in examples 1–4 but using as starting material 11-diethylamino-, 11-dipropylamino-, 11-dibutylamino-, 11-dipentylamino-, 11-dihexylamino-, 11-(N-methylpropylamino)-, 11-(N-butylpentylamino)-, 11-(N-ethylhexylamino)-, 11-(N-methylbenzylamino)-, or 11-(N-propylphenethylamino)-10,5-(epoxymethano)-10,11-dihydro-5H-dibenzo[a,d]cyclohepten-13-one the corresponding 11-diethylamino-, 11-dipropylamino-, 11-dibutylamino-, 11-diphenylamino-, 11-dihexylamino-, 11-(N-methylpropylamino)-, 11-(N-butylpentylamino)-11(N-methylbenzylamino)-, 11-(N-methylbenzylamino)-, or 11-(N-propyl-phenethylamino)-10,5-(epoxymethano)-10,11-dihydro-5H-dibenzo [a,d]-cyclohepten-13-one is obtained.

Treatment of these compounds with hydrochloric, sulfuric oxalic, maleic, or tartaric acids yields the corresponding hydrochloric, sulfuric oxalic, maleic, or tartaric acid addition salts.

We claim:

1. A compound of the formula

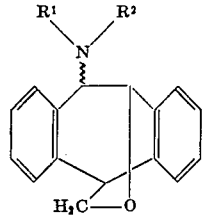

in which $R^1$ and $R^2$ are joined through the nitrogen atom to form part of a heterocycle selected from the group which consists of pyrrolidino, piperidino, morpholino, N'-methylpiperazino and N'-phenylpiperazino; and acid addition salts of said compounds with pharmacologically acceptable acids.

2. 11-Morpholino-10,5-(epoxymethano)-10,11-dihydro-5H-dibenzo-[a,d]cycloheptene.

3. 11-Piperidino-10,5-(epoxymethano)-10,11-dihydro-5H-dibenzo-[a,d]cycloheptene.

4. 11-(N'-Methylpiperazino)-10,5-(epoxymethano)-10,11-dihydro-5H-dibenzo[a,d]-Methylpiperazino)-10,5-(epoxymethano)-10,11-dihydro-5H-dibenzo cycloheptene.

5. The hydrochloride salt of 11-morpholino-10,5-(epoxymethano)-10,11-dihydro-5H-dibenzo[a,d]cycloheptene.

6. The hydrochloride salt of 11-piperidino-10,5-(epoxymethano)-10,11-dihydro-5H-dibenzo[a,d]cycloheptene.

7. The dihydrochloric acid addition salt of 11-(n'-methylpiperazino)-10,5-(epoxymethano)-10,11-dihydro-5H-dibenzo[a,d]cycloheptene.

8. The process of preparing a compound of the formula

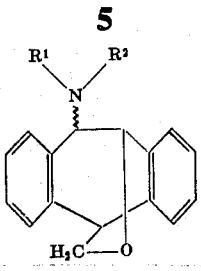

in which $R^1$ and $R^2$ are joined through the nitrogen atom to form part of a heterocycle selected from the group which consists of pyrrolidino, piperidino, morpholino, N'-methylpiperazino and N'-phenylpiperazino; which comprises subjecting a compound of the formula

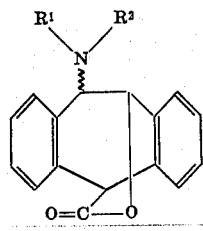

with the grouping $NR^1R^2$ being as above defined, in an inert solvent to the action of an alkali metal aluminum hydride; adding water to the resulting reaction mixture in order to effect hydrolysis of the intermediate complex, thereby securing a compound of the formula

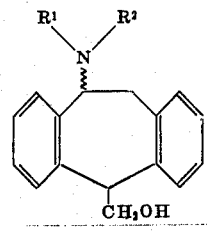

$NR^1R^2$ being as above defined; treating said last-named compound with a molar excess of aqueous mineral acid at an elevated temperature above room temperature; and then adding an alkaline agent to said reaction mixture in amount sufficient to render said reaction mixture alkaline in reaction, thereby obtaining said desired compound.

9. The process, as defined in claim 8, which comprises subjecting said compound of formula

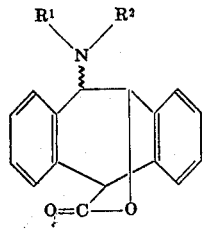

in which $NR^1R^2$ is as defined above to the action of lithium aluminum hydride in an inert solvent at a temperature within the range 30°–100° C. adding water to the resulting reaction mixture in order to effect hydrolysis of the intermediate complex, thereby securing said compound of formula

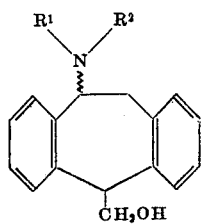

in which $NR^1R^2$ is as defined above; heating said last-named compound with a molar excess of aqueous sulfuric acid of 10 to 50-percent concentration at a temperature within the range of 50°–100° C.; and adding an alkaline agent to the resulting reaction mixture in amount sufficient to render said reaction mixture alkaline in reaction, thereby securing said desired compound.

* * * * *